(12) United States Patent
Itoh et al.

(10) Patent No.: US 9,195,312 B2
(45) Date of Patent: Nov. 24, 2015

(54) INFORMATION PROCESSING APPARATUS, CONFERENCE SYSTEM, AND INFORMATION PROCESSING METHOD

(71) Applicants: Akinori Itoh, Kanagawa (JP); Hidekuni Annaka, Saitama (JP)

(72) Inventors: Akinori Itoh, Kanagawa (JP); Hidekuni Annaka, Saitama (JP)

(73) Assignee: RICOH COMPANY, LIMITED, Tokyo (JP)

(*) Notice: Subject to any disclaimer, the term of this patent is extended or adjusted under 35 U.S.C. 154(b) by 178 days.

(21) Appl. No.: 13/909,229

(22) Filed: Jun. 4, 2013

(65) Prior Publication Data

US 2013/0328767 A1 Dec. 12, 2013

(30) Foreign Application Priority Data

Jun. 8, 2012 (JP) .................................. 2012-131370

(51) Int. Cl.
| | |
|---|---|
| G09G 5/00 | (2006.01) |
| G06F 3/01 | (2006.01) |
| G06F 3/03 | (2006.01) |
| H04N 7/15 | (2006.01) |
| G10L 15/25 | (2013.01) |
| H04L 12/18 | (2006.01) |
| H04M 3/56 | (2006.01) |
| G06F 3/16 | (2006.01) |
| G10L 15/08 | (2006.01) |
| G10L 15/22 | (2006.01) |

(52) U.S. Cl.
CPC .............. *G06F 3/017* (2013.01); *G06F 3/0304* (2013.01); *G10L 15/25* (2013.01); *H04L 12/18* (2013.01); *H04L 12/1827* (2013.01); *H04M 3/567* (2013.01); *H04N 7/15* (2013.01); *G06F 3/167* (2013.01); *G10L 2015/088* (2013.01); *G10L 2015/223* (2013.01); *G10L 2015/228* (2013.01)

(58) Field of Classification Search
CPC ....... G06F 3/017; G06F 3/0304; G06F 3/167; H04N 7/15; H04L 12/1827; H04L 12/18; H04M 3/567; G10L 15/25; G10L 2015/223; G10L 2015/228; G10L 2015/088; G10L 17/24; G10L 17/00
USPC ......................................................... 345/156
See application file for complete search history.

(56) References Cited

U.S. PATENT DOCUMENTS

| | | | | |
|---|---|---|---|---|
| 4,910,782 | A | * | 3/1990 | Watari ........................... 704/266 |
| 6,850,265 | B1 | * | 2/2005 | Strubbe et al. ............. 348/14.05 |
| 6,894,714 | B2 | * | 5/2005 | Gutta et al. ................ 348/14.07 |

(Continued)

FOREIGN PATENT DOCUMENTS

JP 2010-277176 12/2010

*Primary Examiner* — Towfiq Elahi
(74) *Attorney, Agent, or Firm* — Oblon, McClelland, Maier & Neustadt, L.L.P.

(57) ABSTRACT

An information processing apparatus includes a voice acquiring unit configured to acquire voice information remarked by a user; an image information acquiring unit configured to acquire image information of the user; a user specifying unit configured to specify the user having remarked the voice information based on the image information when the voice information is acquired; a word extracting unit configured to extract a word from the voice information; a priority calculating unit configured to increase priority of the user having remarked the word for operation of a display device when the extracted word matches any one of keywords; a gesture detecting unit configured to detect a gesture made by the user based on the image information; and an operation permission determining unit configured to permit the user to operate the display device when the priority of the user having made the gesture is highest.

13 Claims, 11 Drawing Sheets

(56) References Cited

U.S. PATENT DOCUMENTS

2010/0245532 A1* 9/2010 Kurtz et al. ............. 348/14.03
2011/0202912 A1 8/2011 Itoh
2012/0066083 A1 3/2012 Inoue et al.

* cited by examiner

| KEYWORD LIST |
|---|
| AAA |
| BBB |
| CCC |

FIG.4

PRIORITY TABLE

| RANK ORDER | USER ID | PRIORITY |
|---|---|---|
| 1 | A | 2 |
| 2 | B | 1 |
| 2 | D | 1 |

| KEYWORD LIST | EVALUATION VALUE |
|---|---|
| AAA | 10 |
| BBB | 1 |
| DDD | 1 |

FIG.11

PRIORITY TABLE

| RANK ORDER | USER ID | PRIORITY |
|---|---|---|
| 1 | A | 10 |
| 2 | B | 1 |
| 2 | D | 1 |

FIG.12

WORD HISTORY TABLE

| WORD KEYWORD | REMARK TIME |
|---|---|
| AAA | 10:04 |
| BBB | 10:06 |
| CCC | 14:19 |

FIG.13

PRIORITY TABLE

| RANK ORDER | USER ID | PRIORITY |
|---|---|---|
| 3 | A | 0 |
| 2 | B | 0 |
| 1 | C | 1 |

FIG.14

PRIORITY TABLE

| RANK ORDER | USER ID | PRIORITY | UPDATE DATE-AND-TIME |
|---|---|---|---|
| 3 | A | 0 | 2011/8/4 14:25 |
| 2 | B | 0 | 2011/8/4 15:00 |
| 1 | C | 1 | 2011/8/4 16:00 |

FIG.15

THRESHOLD LIST OF DOCUMENT a

| NUMBER OF PAGES | THRESHOLD |
|---|---|
| 1-4 | 1 |
| 6 | 2 |
| 5, 7-10 | 0 |

INFORMATION PROCESSING APPARATUS, CONFERENCE SYSTEM, AND INFORMATION PROCESSING METHOD

CROSS-REFERENCE TO RELATED APPLICATION

The present application claims priority to and incorporates by reference the entire contents of Japanese Patent Application No. 2012-131370 filed in Japan on Jun. 8, 2012.

BACKGROUND OF THE INVENTION

1. Field of the Invention

The present invention relates to an information processing apparatus, a conference system, and an information processing method.

2. Description of the Related Art

Conventionally, there has been in a practical use a conference system in which operation of turning over documents or operation of enlarging or reducing a screen image is possible thorough the gestures of a user such as actions of his/her hand relative to a screen projected with a projector. In such a conference system, kinds of gestures are registered preliminarily. The kind of the gesture is distinguished based on the actions of the user captured with an imaging device such as a camera, and operation processing to be executed is determined.

For example, Japanese Patent Application Laid-open No. 2010-277176 discloses a technique of allowing a plurality of users to use a conference system. To be more specific, the users can acquire operation permission by making a certain gesture, and any of the users who have such operation permission can exclusively operate a screen.

When operation permission is given to a user in response to the gestures of the user, however, it is possible that when a plurality of presentations are made in proximity to one another, the gestures of another user who is not related to contents of one of the presentations may be detected, whereby the operation permission for the presentation is provided to such user.

Therefore, there is a need to provide an information processing apparatus capable of preventing a case where operation permission is provided unintentionally to users who are not related to the contents of a presentation.

SUMMARY OF THE INVENTION

It is an object of the present invention to at least partially solve the problems in the conventional technology.

According to an embodiment, there is provided an information processing apparatus that includes a voice acquiring unit configured to acquire voice information remarked by a user; an image information acquiring unit configured to acquire image information of the user; a user specifying unit configured to specify the user having remarked the voice information, based on the image information of the user acquired by the image information acquiring unit when the voice information is acquired by the voice acquiring unit; a word extracting unit configured to extract a word from the voice information; a keyword storage unit configured to store therein keywords; a priority calculating unit configured to increase priority of the user having remarked the word for operation of a display device when the extracted word matches any one of the keywords; a gesture detecting unit configured to detect a gesture made by the user based on the image information of the user acquired by the image information acquiring unit; and an operation permission determining unit configured to permit the user to operate the display device when the priority of the user having made the gesture detected by the gesture detecting unit is highest.

According to another embodiment, there is provided a conference system that includes a voice acquiring unit configured to acquire voice information remarked by a user; an image information acquiring unit configured to acquire image information of the user; a user specifying unit configured to specify the user having remarked the voice information based on the image information of the user acquired by the image information acquiring unit when the voice information is acquired by the voice acquiring unit; a word extracting unit configured to extract a word from the voice information; a keyword storage unit configured to store therein keywords; a priority calculating unit configured to increase priority of the user having remarked the word for operation of a display device when the extracted word matches any one of the keywords; a gesture detecting unit configured to detect a gesture made by the user based on the image information of the user acquired by the image information acquiring unit; and an operation permission determining unit configured to permit the user to operate the display device when the priority of the user having made the gesture detected by the gesture detecting unit is highest.

According to still another embodiment, there is provided an information processing method that includes acquiring voice information remarked by a user; acquiring image information of the user; specifying the user having remarked the voice information based on the acquired image information of the user when the voice information is acquired; extracting a word from the voice information; increasing priority of the user having remarked the word for operation of a display device when the extracted word matches any one of keywords stored in a keyword storage unit; detecting a gesture made by the user based on the acquired image information of the user; and permitting the user to operate the display device when the priority of the user having made the detected gesture is highest.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, embodiments in which the information processing apparatus of the invention is realized in a conference system are described in detail with reference to the attached drawings.

First Embodiment

Figure 1:
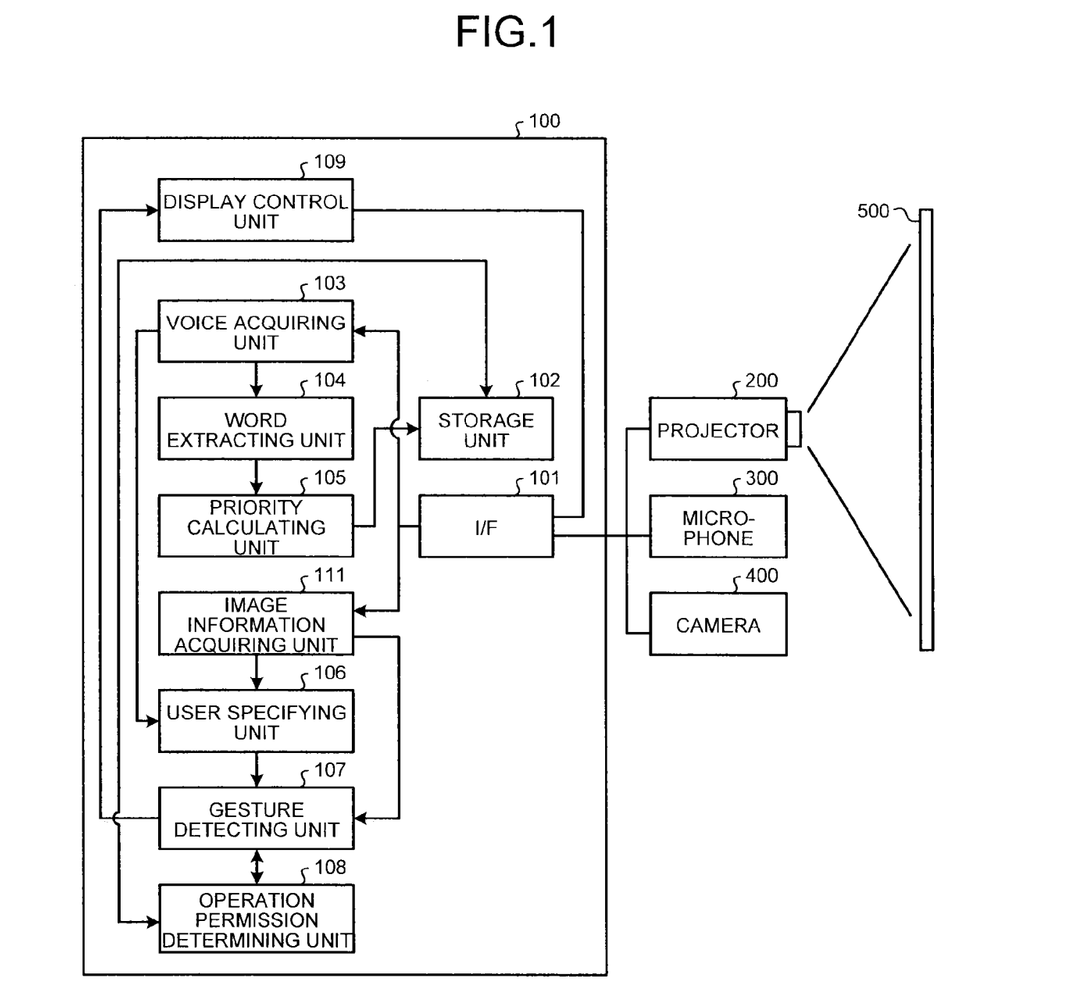
FIG. 1 is a diagram illustrating functional blocks of an information processing apparatus according to a first embodiment.

A first embodiment is described with reference to FIG. 1 that is a functional block diagram of the information processing apparatus. The first example exemplifies a conference system in which an information processing apparatus 100 is connected to a display device 200 that is a projector, a microphone 300 that is a sound collecting device, and a camera 400 that is an imaging device. The information processing apparatus 100 may be configured integrally with the display device 200, or may be a remote device connected to a network and provided in a different place. In the information processing apparatus 100, generated image data is projected on a screen 500 from the display device 200.

The information processing apparatus 100 includes an interface (I/F) 101, a storage unit 102, a voice acquiring unit 103, a word extracting unit 104, a priority calculating unit 105, a user specifying unit 106, a gesture detecting unit 107, an operation permission determining unit 108, an image information acquiring unit 111, and a display control unit 109. The I/F 101 inputs and outputs data to and from the display device 200, the microphone 300, and the camera 400 that are connected to the apparatus. The storage unit 102 includes a recording medium that is readable and writable such as a random-access memory (RAM) and a hard disk, and stores data processed in the units described in the following.

The voice acquiring unit 103 acquires voice information from the microphone 300 obtained through the I/F 101. The voice information includes voice representing the remarks of respective users and time of acquisition thereof. The image information acquiring unit 111 acquires image information from the camera 400 obtained through the I/F 101. The word extracting unit 104 acquires a word from the obtained voice information. The extraction of word from voice can be realized using a conventional voice processing technique.

The user specifying unit 106 specifies a user appearing in the image information from the camera 400 obtained through the I/F 101. As a method of specifying user based on image information, it is possible to employ a conventional technique such as a method of specifying user based on a position at which the picture of a user was taken, and a method of specifying user using a face recognition technique. The gesture detecting unit 107 detects gestures based on the obtained image information. The kinds of gestures are stored preliminarily in the storage unit 102. The gesture detecting unit 107 recognizes the action of the user as a gesture when the action matches the stored kinds of gestures.

The priority calculating unit 105 calculates the priority of respective users depending on whether a word extracted from the voice information matches a keyword stored in the storage unit 102. Here, the priority calculating unit 105 also specifies a user who has remarked the word based on information of the users specified by the user specifying unit 106, e.g., the user ID. The operation permission determining unit 108 determines a user to whom operation permission is to be provided based on the value of priority thereof. The display control unit 109 generates an operation screen to be displayed on the display device 200, and transmits an instruction for displaying, on a screen, operation corresponding to a gesture of the user to whom operation permission is provided by the determination of the operation permission determining unit 108, to the display device 200.

Figure 2:
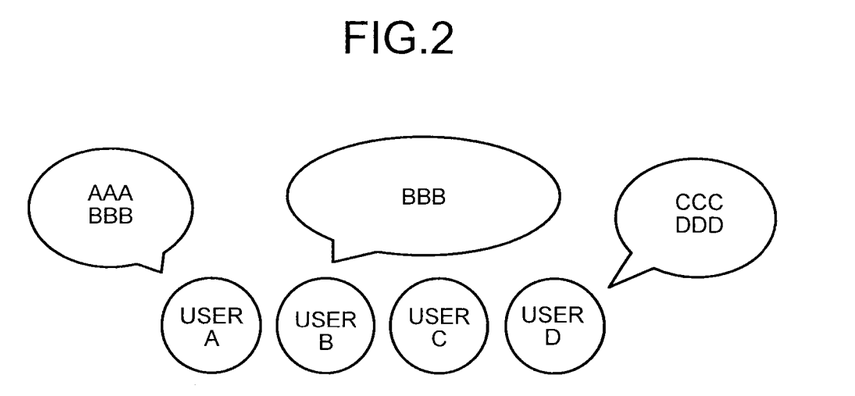
FIG. 2 is a diagram illustrating an example of remarks of users in the first embodiment.
Figure 3:
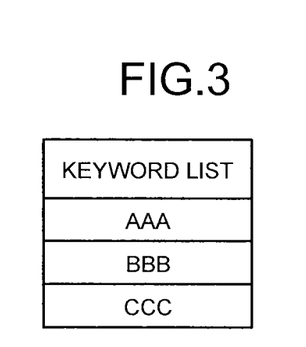
FIG. 3 is a diagram illustrating an example of a keyword list in the first embodiment.
Figure 4:
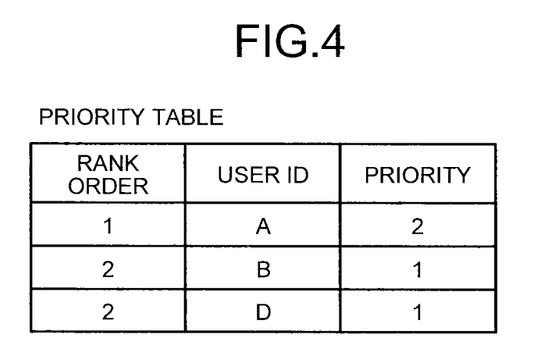
FIG. 4 is a diagram illustrating an example of a priority table in the first embodiment.
Figure 5:
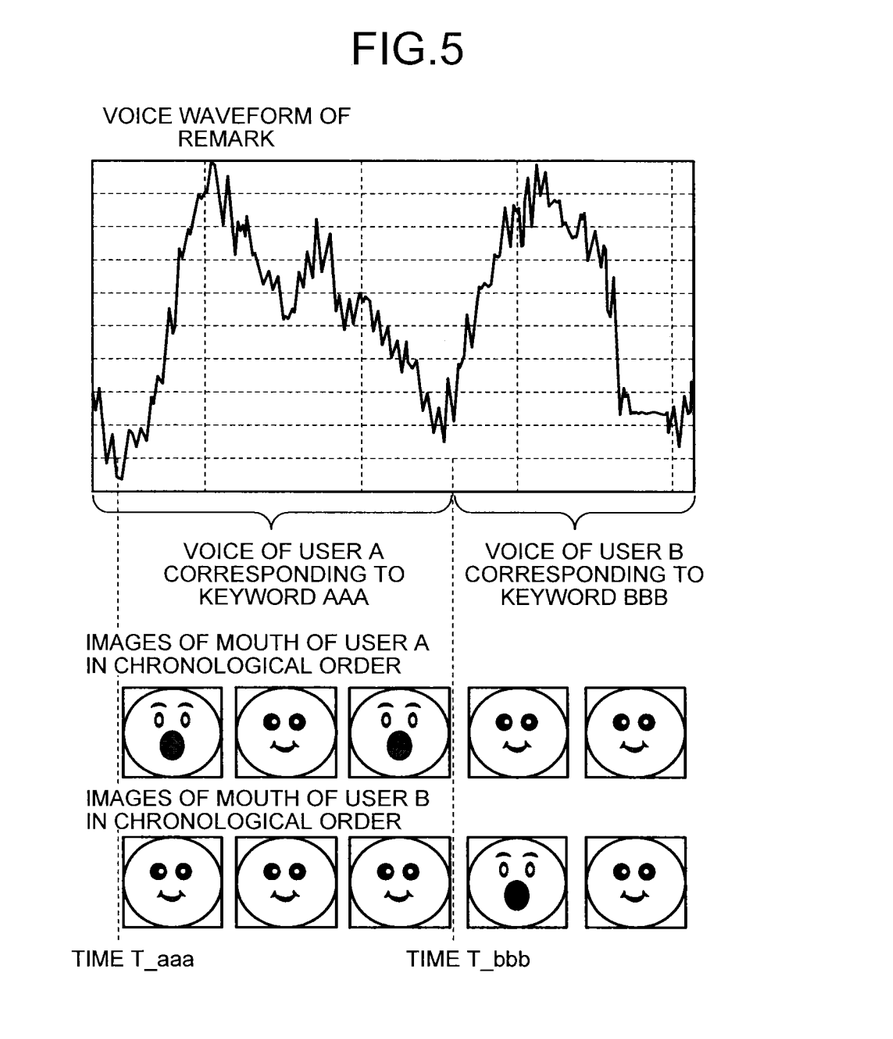
FIG. 5 is a diagram illustrating an example of voice information and image information in the first embodiment.

In order to calculate priority, it is necessary to specify the current priority of respective users and a user who has remarked the extracted word. First, a method of specifying current priority of the users is described. FIG. 2 is a diagram illustrating an example of keywords remarked by the users. FIG. 3 illustrates an example of a keyword list, and FIG. 4 illustrates an example of a priority table. FIG. 5 is a diagram illustrating an example of obtained voice information and image information. The following description exemplifies a case where a user A has remarked words "AAA" and "BBB", a user B has remarked a word "BBB", and a user D has remarked words "CCC" and "DDD", as illustrated in FIG. 2.

As illustrated in FIG. 3, the keyword list stored in the storage unit 102 stores therein "AAA", "BBB", and "CCC" as keywords. Therefore, an evaluation value for calculating priority is added to only users who have remarked words matching the keywords among the words remarked by the users A to D. In the first embodiment, an evaluation value is set to "1" for all of the keywords, and the number of remarks of keywords represents priority.

As illustrated in FIG. 4, the user A who has remarked two keywords is "2" in priority, and his/her rank order is set to "1". Each of the user B and the user D who have remarked one keyword is "1" in priority, and their rank orders are set to "2". In this case, therefore, the operation permission determining unit 108 provides permission for operating an operation screen displayed by the display device 200 to the user A who is highest in priority.

Next, the method of specifying a user who has remarked a word is described. As illustrated in FIG. 5, the word extracting unit 104 stores remark time acquired for each word in the storage unit 102. The user specifying unit 106 acquires a user moving his/her mouth and time of acquisition thereof from the obtained image information, and stores them in the storage unit 102. Then, the priority calculating unit 105 associates the user with a remarked word, the user having remarked in the same time slot with that of the remarked word. If the word matches keywords, the priority calculating unit 105 updates the value of priority of the user who has remarked the word.

Figure 6:
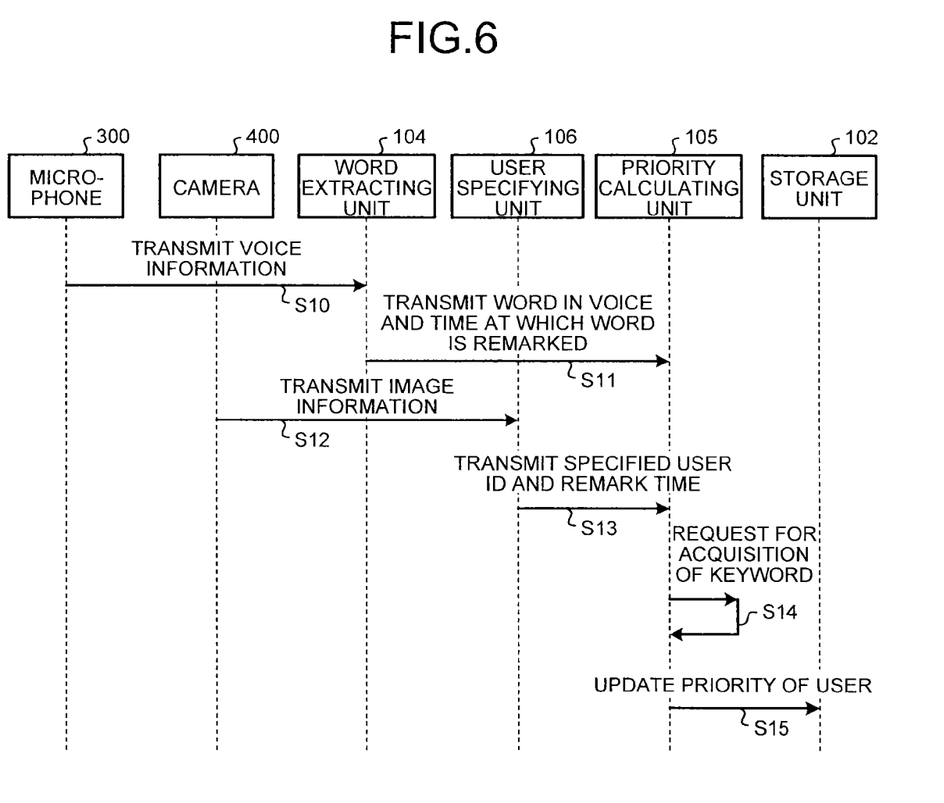
FIG. 6 is a sequence diagram illustrating a flow of processing for calculating priority of users in the first embodiment.

Next, a flow of processing for determining priority of users is described with reference to FIG. 6. As illustrated in FIG. 6, the microphone 300 first transmits collected voice information to the word extracting unit 104 through the voice acquiring unit 103 (Step S10). Then, the word extracting unit 104 extracts a word and remark time thereof from the voice information, and transmits them to the priority calculating unit 105 (Step S11).

The camera 400 transmits the collected image information to the user specifying unit 106 (Step S12). The user specifying unit 106 specifies a user appearing in the image based on the obtained image information, and transmits the user ID of the specified user and the remark time thereof to the priority calculating unit 105 (Step S13). The priority calculating unit 105 associates the user ID of the user with the word, which has the same received remark time, and specifies the user who has remarked the word. Then, the priority calculating unit 105 transmits a request for acquiring keywords to the storage unit 102 (Step S14). Then, the priority calculating unit 105 updates the priority of the user who has remarked the word matching the keywords stored in the storage unit 102 (Step S15).

Figure 7:
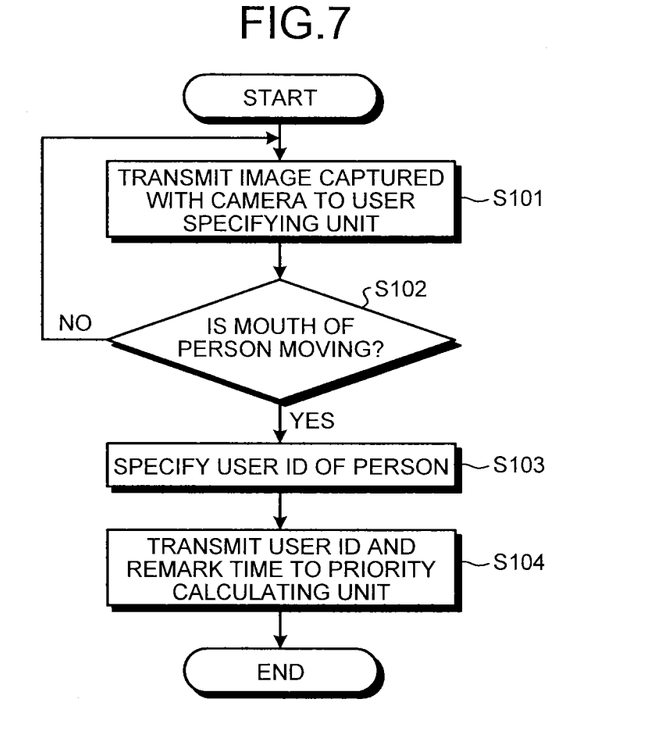
FIG. 7 is a flowchart illustrating a flow of processing for specifying a user in the first embodiment.

Next, a flow of specifying a user is described with reference to FIG. 7. As illustrated in FIG. 7, the camera 400 first transmits captured image information to the user specifying unit 106 through the I/F 101 (Step S101). Next, the user specifying unit 106 determines whether the mouth of a person appearing in an image included in the image information is moving (Step S102). If it is determined that the mouth is moving (Yes at Step S102), the user specifying unit 106 specifies the user ID of the person moving his/her mouth (Step S103). If it is determined that the mouth is not moving (No at Step S102), the processing at Step S101 is repeated until an image in which a mouth of a person is moving is detected.

Then, the user specifying unit 106 associates the specified user ID with the remark time that is time at which the moving image representing the motion of the mouth is captured, transmits them to the priority calculating unit 105, and then finishes processing (Step S104).

Figure 8:
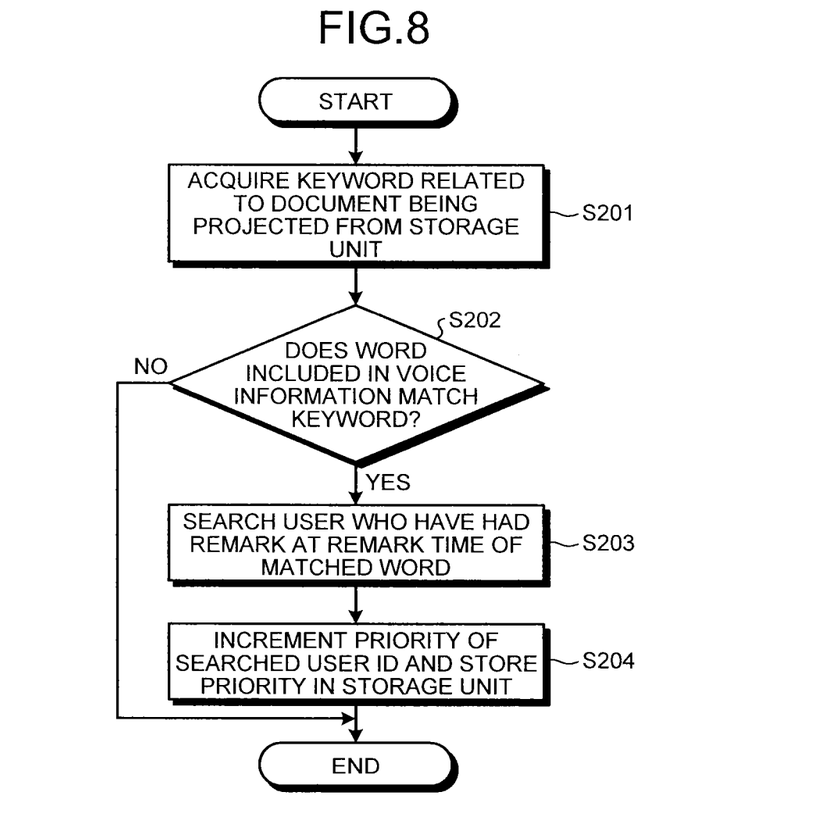
FIG. 8 is a flowchart illustrating a flow of processing for calculating priority of users in the first embodiment.

Next, a flow of calculating priority of users is described with reference to FIG. 8. As illustrated in FIG. 8, the priority calculating unit 105 acquires keywords, which relate to a document being projected, from the storage unit 102 (Step S201). In the first embodiment, after documents used in a presentation are stored in the storage unit 102 once, words included in the documents are automatically extracted when the documents are read and stored as keywords. It is possible to register not all of the words but only words that appear given number of times or more. It is also possible that a user stores keywords in a keyword list manually.

The priority calculating unit 105 determines whether a word extracted from the voice information matches keywords registered in the keyword list (Step S202). If it is determined that the word matches any of the keywords (Yes at Step S202), the priority calculating unit 105 searches a user who has remarked the matched word at the remark time thereof based on information of remark history for each user (Step S203). Then, the priority calculating unit 105 adds an evaluation value of 1 to the current priority of the searched user that is stored in the storage unit 102 to update the priority, and finishes processing (Step S204).

Figure 9:
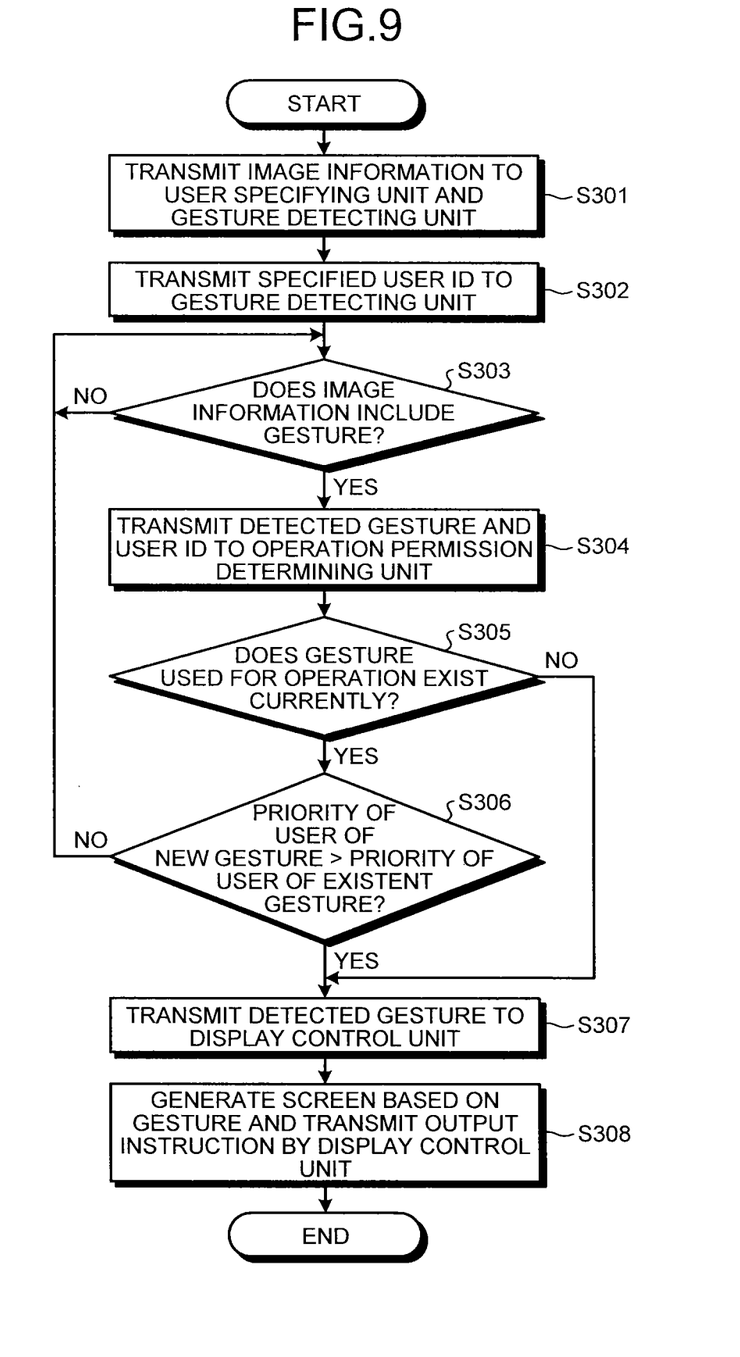
FIG. 9 is a flowchart illustrating a flow of processing for determining whether a user is permitted to operate in the first embodiment.

Subsequently, a flow of processing performed when a gesture operating an operation screen is detected is described with reference to FIG. 9. The processing starts when documents are projected through the display device 200. When a user makes some action, the camera 400 first transmits captured image information to both the user specifying unit 106 and the gesture detecting unit 107 through the I/F 101 (Step S301). The user specifying unit 106 transmits the user ID specified based on the image information to the gesture detecting unit 107 (Step S302).

The gesture detecting unit 107 determines whether the obtained image information includes a predetermined gesture (Step S303).

If it is determined that the obtained image information includes the predetermined gesture (Yes at Step S303), the gesture detecting unit 107 transmits the detected gesture to the operation permission determining unit 108 together with the user ID (Step S304). If it is determined that the obtained image information does not include the predetermined gesture (No at Step S303), the processing is repeated until an action including such a gesture is detected.

Next, the operation permission determining unit 108 determines whether another gesture used for operation exists currently (Step S305). If it is determined that another gesture used for operation exists currently (Yes at Step S305), the operation permission determining unit 108 determines whether the priority of a user who has made a newly detected gesture is greater than the priority of the user who has made another existent gesture (Step S306). If it is determined that the priority of the user who has made a newly detected gesture is greater than the priority of the user who has made another existent gesture (Yes at Step S306), the operation permission determining unit 108 transmits the newly detected gesture to the display control unit 109 (Step S307). If it is determined that no gesture used for operation exists currently (No at Step S305), the procedures shifts to Step S307 skipping the processing at Step S306. If it is determined that the priority of the user who has made a newly detected gesture is smaller than the priority of the user who has made another existent gesture (No at Step S306), the procedures returns to Step S303.

Finally, the display control unit 109 generates a screen reflecting the operation results based on the received gesture of the user to whom operation permission is provided, instructs the display device 200 to output the screen, and then finishes processing (Step S308).

According to the information processing apparatus 100 in the first embodiment, which is described above, operation permission is provided to the user who has remarked a word matching the keywords corresponding to documents. Thus, it is possible to prevent a case where operation screen operation permission is provided unintentionally to another user who makes another presentation hardly related to the contents of the presentation.

Second Embodiment

Figure 10:
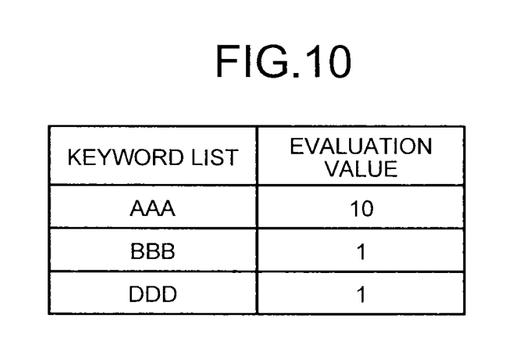
FIG. 10 is a diagram illustrating an example of a keyword list according to a second embodiment.
Figure 11:
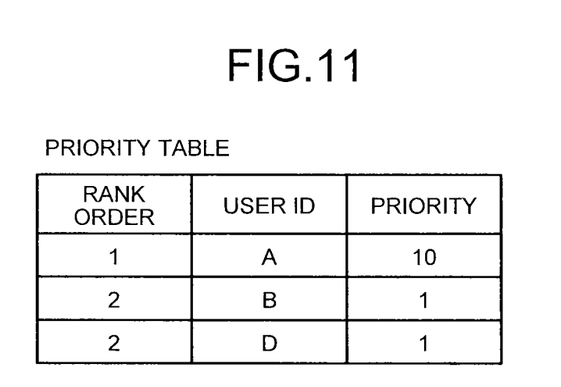
FIG. 11 is a diagram illustrating an example of a priority table in the second embodiment.

Next, a second embodiment of the information processing apparatus 100 is described. In the second embodiment, evaluation values assigned to the keywords remarked by the users are different depending on a keyword. Therefore, an evaluation value is not equally added depending on the number of remarks, and a higher evaluation value can be assigned to a more important keyword. For example, 10 points are assigned to the keyword "AAA" as an evaluation value, while 1 point is assigned to other keywords, as illustrated in FIG. 10. Thus, the priority of a user who has remarked the keyword "AAA" becomes higher in such a case. As illustrated in FIG. 11, the user A is higher in priority although the number of remarks of the keywords is same.

According to such an information processing apparatus 100, it is possible to provide operation permission preferentially to the user who has remarked keyword higher in importance.

Third Embodiment

Figure 12:
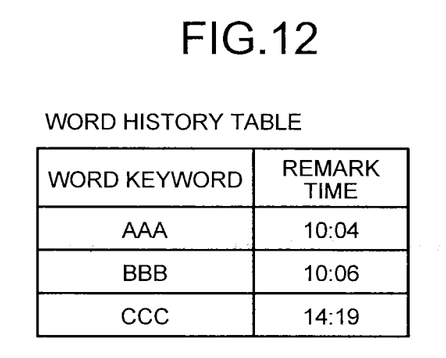
FIG. 12 is a diagram illustrating an example of a word remark history table according to a third embodiment.

Next, a third embodiment of the information processing apparatus 100 is described. The third embodiment is characterized in that only keywords remarked at or after predetermined reference time, among all the keywords remarked by the users, are set as evaluation targets when priority is calculated. FIG. 12 is a diagram illustrating an example of a word remark history table. In the third embodiment, a word remark history table is newly stored in the storage unit 102. The word extracting unit 104 stores, every time a word newly remarked by a user is extracted, the remarked word and the remark time in the word remark history table. In the third embodiment, only words remarked at or after 12:00 that is reference time are set as priority evaluation targets. The reference time is stored in the storage unit 102, and may be appropriately changed by a user.

Figure 13:
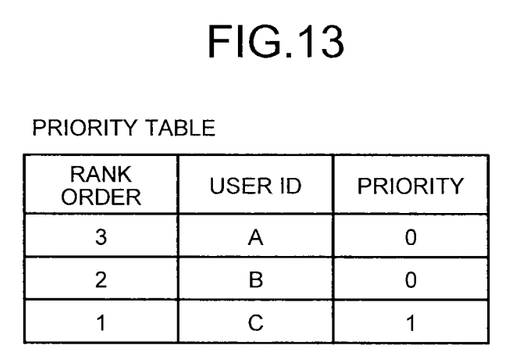
FIG. 13 is a diagram illustrating an example of a priority table in the third embodiment.

As illustrated in FIG. 13, the priority calculating unit 105 thus adds only a keyword evaluation value of the word "CCC" that is a remark at or after 12:00 as predetermined time to the priority. In this manner, it is possible to adjust such that remarks at or before predetermined start time of presentation are not taken into consideration when operation permission is provided, for example.

Fourth Embodiment

Next, a fourth embodiment of the information processing apparatus 100 is described. In the fourth embodiment, users whose priority table has not been updated for a predetermined period, that is, users who have not remarked words for a predetermined period are deleted from the priority table, or their keyword values are initialized to "0".

Figure 14:
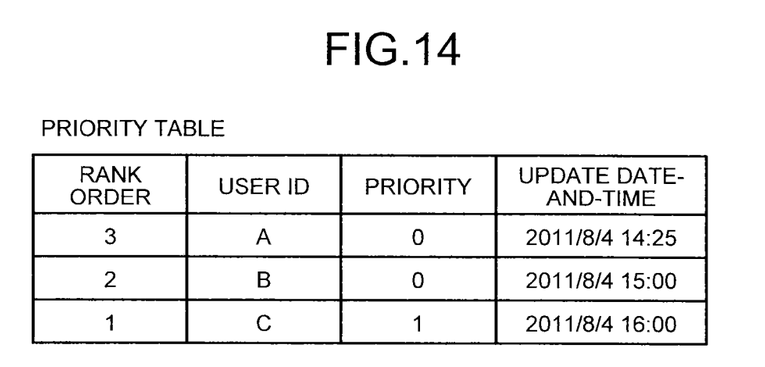
FIG. 14 is a diagram illustrating an example of a priority table according to a fourth embodiment.

As illustrated in FIG. 14, the priority table stores last update date-and-time for each user. Once given time has elapsed since the update date-and-time, the processing described above is performed. Such processing can prevent an increase in a data amount in the priority table.

In the embodiments described above, it is also possible to arrange so that operation permission is not provided to even a user highest in priority unless the number of his/her remarks of keywords is not a predetermined number of times or more, for example.

In the embodiments described above, the priority table preliminarily stores records for respective users. However, the arrangement may be such that when a user remarks a keyword for the first time, the user ID is added together with the calculated priority, for example. In such a case, operation permission is not provided to a user who has been registered in the priority table for the first time even if the user is higher in priority than other users, which prevent unintentional changes of permission such as a case where an accidental remark of a user makes his/her priority higher unexpectedly and thus operation permission is provided to the user.

Figure 15:
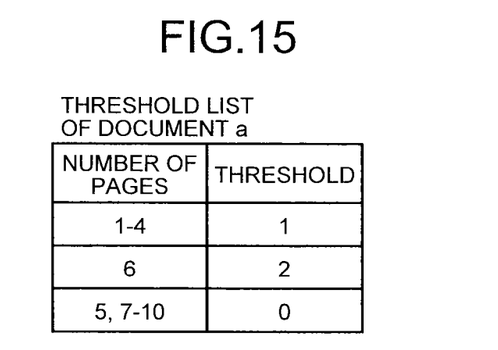
FIG. 15 is a diagram illustrating an example of thresholds for each page of a document.

As illustrated in FIG. 15, it is also possible to arrange so that, with setting of the priority and the number of remarks that are necessary for providing operation permission to the users for each document or each page of a document, operation permission is provided only when such thresholds are exceeded.

A computer program executed in the information processing apparatuses of the embodiments is recorded, as a file whose format is installable or executable, in a computer-readable storage medium such as a compact disc read only memory (CD-ROM), a flexible disk (FD), a compact disc recordable (CD-R), and a digital versatile disk (DVD), and then provided.

The program executed in the information processing apparatuses of the embodiments may be stored in a computer connected to a network such as the Internet, and then provided by download thereof through the network. Alternatively, the program executed in the information processing apparatuses of the embodiments may be provided or distributed through the network such as the Internet.

The program executed in the information processing apparatuses of the embodiments may be preliminarily embedded in a read only memory (ROM), etc. and then provided.

The program executed in the information processing apparatuses of the embodiments is of a module configuration including the units described above. As actual hardware, a central processing unit (CPU) reads out a device control program from the recording medium and executes it, whereby the units described above are loaded on a main memory, and generated on the main memory.

The program executed in the information processing apparatuses of the embodiments may be recorded, as a file whose format is installable or executable, in a computer-readable storage medium such as a CD-ROM, an FD, a CD-R, and a DVD, and then provided.

According to the embodiments, it is possible to provide an effect of preventing a case where operation screen operation permission is provided unintentionally to users who are not related to contents of a presentation.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
a keyword memory configured to store therein keywords; and
processing circuitry configured to
acquire voice information remarked by a user;
to acquire image information of the user;
specify the user having remarked the voice information, based on the acquired image information of the user when the voice information is acquired;
extract a word from the voice information;
increase priority of the user having remarked the word for operation of a display when the extracted word matches any one of the keywords;
detect a gesture made by the user based on the acquired image information of the user; and
permit the user to operate the display when the priority of the user having made the detected gesture is highest,
wherein the keyword memory extracts the keywords from information to be displayed on the display, and stores therein the keywords, and
the processing circuitry permits the user to operate the display when the priority of the user is highest and a number of remarks of the keywords by the user is equal to or greater than a smallest number of remarks determined in advance for each page of information being displayed.

2. The information processing apparatus according to claim 1, wherein
the keyword memory stores therein an evaluation value for each of the keywords in association with each other, and
the processing circuitry adds the evaluation value corresponding to the keyword to the priority.

3. The information processing apparatus according to claim 1, wherein
the processing circuitry acquires a remark time of the word, and the processing circuitry determines whether the word matches any one of the keywords with respect to only words remarked at or after a predetermined time.

4. The information processing apparatus according to claim 1, wherein the processing circuitry permits the user to operate the display when the priority of the user is highest and the number of remarks of the keywords by the user is equal to or greater than a predetermined threshold.

5. The information processing apparatus according to claim 1, wherein the priority memory stores therein a last update time at which the priority is updated last, and deletes a record of the user once a predetermined time has elapsed since the last update time.

6. A conference system, comprising:
    a keyword memory configured to store therein keywords; and
    processing circuitry configured to
        acquire voice information remarked by a user;
        acquire image information of the user;
        the user having remarked the voice information based on the acquired image information of the user when the voice information is acquired;
        extract a word from the voice information;
        increase priority of the user having remarked the word for operation of a display when the extracted word matches any one of the keywords;
        detect a gesture made by the user based on the acquired image information of the user; and
        permit the user to operate the display when the priority of the user having made the detected gesture is highest,
    wherein the keyword memory extracts the keywords from information to be displayed on the display, and stores therein the keywords, and
    the processing circuitry permits the user to operate the display when the priority of the user is highest and a number of remarks of the keywords by the user is equal to or greater than a smallest number of remarks determined in advance for each page of information being displayed.

7. The conference system according to claim 6, wherein the keyword memory stores therein an evaluation value for each of the keywords in association with each other, and the processing circuitry adds the evaluation value corresponding to the keyword to the priority.

8. The conference system according to claim 6, wherein the processing circuitry acquires a remark time of the word, and the processing circuitry determines whether the word matches any one of the keywords with respect to only words remarked at or after a predetermined time.

9. The conference system according to claim 6, wherein the processing circuitry permits the user to operate the display when the priority of the user is highest and the number of remarks of the keywords by the user is equal to or greater than a predetermined threshold.

10. The conference system according to claim 6, wherein the priority memory stores therein a last update time at which the priority is updated last, and deletes a record of the user once a predetermined time has elapsed since the last update time.

11. An information processing method, comprising:
    acquiring voice information remarked by a user;
    acquiring image information of the user;
    specifying, by processing circuitry, the user having remarked the voice information based on the acquired image information of the user when the voice information is acquired;
    extracting, by the processing circuitry, a word from the voice information;
    increasing priority of the user having remarked the word for operation of a display when the extracted word matches any one of keywords stored in a keyword memory;
    detecting, by the processing circuitry, a gesture made by the user based on the acquired image information of the user; and
    permitting the user to operate the display when the priority of the user having made the detected gesture is highest,
the method further comprising
    extracting the keywords from information to be displayed on the display;
    storing the extracted keywords; and
    permitting the user to operate the display when the priority of the user is highest and a number of remarks of the keywords by the user is equal to or greater than a smallest number of remarks determined in advance for each page of information being displayed.

12. The information processing apparatus according to claim 1, further comprising a priority memory configured to store therein the priority calculated for each user, wherein the processing circuitry is further configure to
    add information on a new user to the priority memory together with the priority calculated for the new user when a word remarked by the new user matches any one of the keywords,
    determine whether the user having made the gesture is stored in the memory when the gesture is detected, and not permit the user to operate the display when it is determined that the information on the user is not stored in the priority memory.

13. The conference system according to claim 8, further comprising a priority memory configured to store therein the priority calculated for each user,
    wherein the processing circuitry adds information on a new user to the priority memory together with the priority calculated for the new user when a word remarked by the new user matches any one of the keywords,
    the processing circuitry determines whether information on the user having made the gesture is stored in the priority memory when the gesture is detected, and
    the processing circuitry does not permit the user to operate the display when it is determined that the information on the user is not stored in the priority memory.

* * * * *